US012190529B2

(12) United States Patent
Kashimoto et al.

(10) Patent No.: US 12,190,529 B2
(45) Date of Patent: Jan. 7, 2025

(54) INFORMATION PROCESSING SYSTEM, INFORMATION PROCESSING METHOD, AND PROGRAM FOR DETECTING CARRIED OBJECTS

(71) Applicant: KABUSHIKI KAISHA TOSHIBA, Tokyo (JP)

(72) Inventors: Yushiro Kashimoto, Yokohama Kanagawa (JP); Yuto Yamaji, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 541 days.

(21) Appl. No.: 17/465,777

(22) Filed: Sep. 2, 2021

(65) Prior Publication Data
US 2022/0230333 A1     Jul. 21, 2022

(30) Foreign Application Priority Data
Jan. 19, 2021  (JP) .................. 2021-006183

(51) Int. Cl.
*G06V 20/52* (2022.01)
*G06T 7/254* (2017.01)
(52) U.S. Cl.
CPC .............. *G06T 7/254* (2017.01); *G06V 20/52* (2022.01); *G06T 2207/20224* (2013.01)
(58) Field of Classification Search
CPC .......... G06T 7/254; G06T 2207/20224; G06V 20/52
See application file for complete search history.

(56) References Cited

U.S. PATENT DOCUMENTS

| 7,650,012 | B2 | 1/2010 | Shibuya | |
| 9,870,684 | B2 * | 1/2018 | Wang | G08B 13/19682 |
| 10,401,948 | B2 * | 9/2019 | Ooi | G06F 3/017 |
| 10,417,773 | B2 * | 9/2019 | Yano | G06T 7/248 |
| 11,335,210 | B2 * | 5/2022 | Wexler | G09B 21/006 |
| 11,573,574 | B2 * | 2/2023 | Tateno | G05D 1/0274 |
| 11,580,785 | B1 * | 2/2023 | Kundu | G06T 7/246 |

(Continued)

FOREIGN PATENT DOCUMENTS

| JP | 2006071471 A | 3/2006 |
| JP | 2013045351 A | 3/2013 |

(Continued)

OTHER PUBLICATIONS

Japanese Office Action dated Dec. 19, 2023, mailed in counterpart Japanese Application No. 2021-006183, 8 pages (with translation).

*Primary Examiner* — Shefali D Goradia
(74) *Attorney, Agent, or Firm* — Kim & Stewart LLP

(57) ABSTRACT

According to one embodiment, an information processing system includes a processor configured to detect a first object in an image in time-series image data and output object information indicating a detection of the first object. The processor calculates a movement status of one or more pixels included in the image by using a plurality of images in the time-series image data, and then outputs movement information indicating the movement status of the one or more pixels. The processor then detects whether a second object moves in conjunction with the first object based on the object information and the movement information.

10 Claims, 11 Drawing Sheets

(56) References Cited

U.S. PATENT DOCUMENTS

| | | | |
|---|---|---|---|
| 2010/0246901 A1* | 9/2010 | Yang | B60R 1/00 |
| | | | 382/154 |
| 2016/0307332 A1* | 10/2016 | Ranjan | A63F 13/213 |
| 2017/0212517 A1* | 7/2017 | Houle | G05D 1/0251 |
| 2021/0312422 A1* | 10/2021 | Lee | A47F 9/04 |
| 2022/0060617 A1* | 2/2022 | Jeon | H04N 23/611 |
| 2022/0366596 A1* | 11/2022 | Katsura | G06T 7/70 |

FOREIGN PATENT DOCUMENTS

| | | | | |
|---|---|---|---|---|
| JP | 2016009448 A | 1/2016 | | |
| JP | 2016057998 A | 4/2016 | | |
| JP | 6444573 B2 | 12/2018 | | |
| WO | WO-2022180453 A1 * | 9/2022 | | G06T 7/20 |

\* cited by examiner

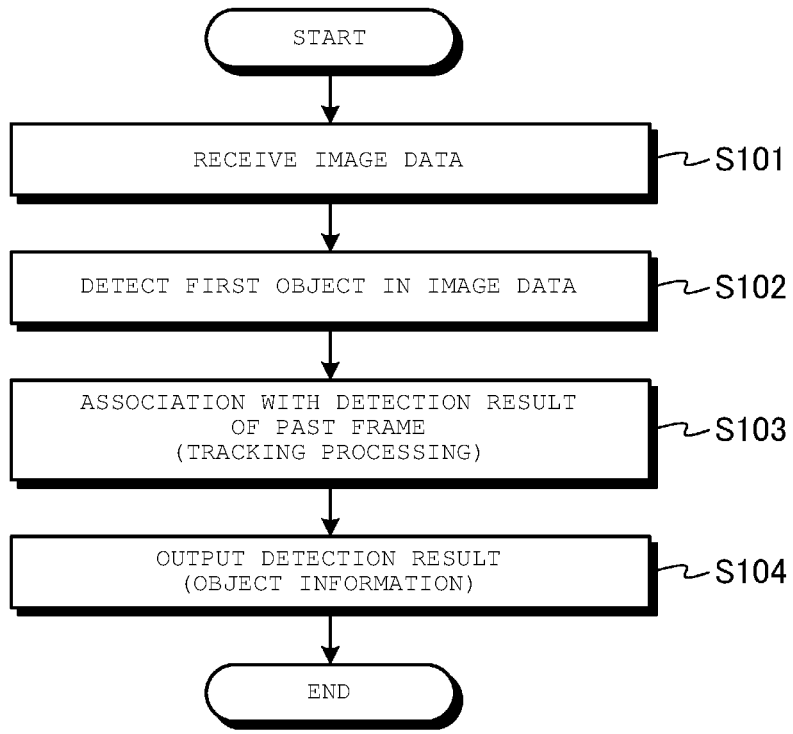
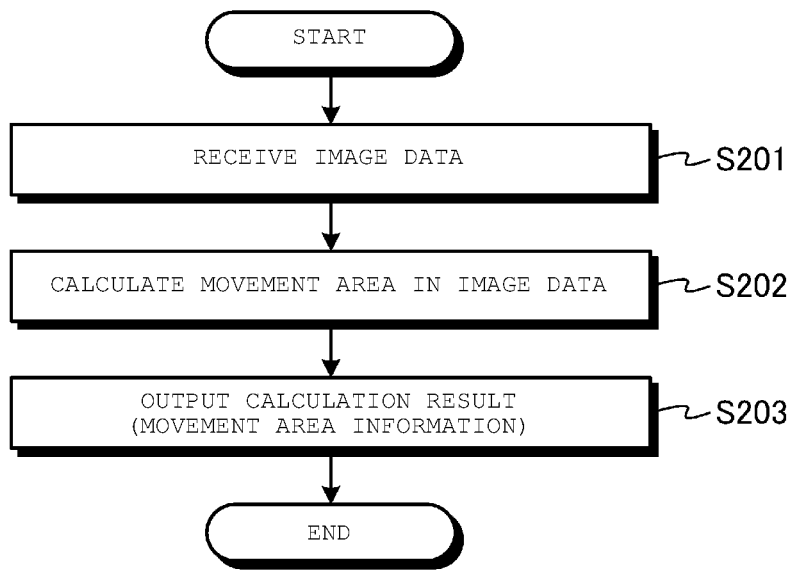

INFORMATION PROCESSING SYSTEM, INFORMATION PROCESSING METHOD, AND PROGRAM FOR DETECTING CARRIED OBJECTS

INCORPORATION BY REFERENCE RELATED APPLICATION

This application is based upon and claims the benefit of priority from Japanese Patent Application No. 2021-006183, filed Jan. 19, 2021, the entire contents of which are incorporated herein by reference. Any and all applications for which a foreign or domestic priority claim is identified in the Application Data Sheet as filed with the present application are hereby incorporated by reference under 37 CFR 1.57.

FIELD

Embodiments described herein relate generally to an information processing system, an information processing method and a program related to object detection and work content monitoring.

BACKGROUND

A technology for detecting objects and recognizing the work of an operator by using image data or the like that has been captured by a camera has been proposed. For example, a technology has been proposed in which a part of a person's body and another object are detected in image data, and then the work being performed by the person can be recognized by associating the person with the detected object.

BRIEF DESCRIPTION OF THE DRAWINGS

FIG. 2 is a flowchart of detection processing according to a first embodiment.

FIG. 3 is a flowchart of calculation processing according to a first embodiment.

DETAILED DESCRIPTION

In related art, the accuracy of detection or recognition may be reduced when multiple objects must be detected within the same image. For example, when cargo being transported by a person is targeted as an object for detection rather than the person transporting the cargo, it may be difficult to detect the cargo object because its appearance and shape may be different for each scene (image). Furthermore, when a plurality of similar objects exist in the image data within the vicinity of the person, the attempted association between person and object based on the detection of the person (or a part of the person) and the object in the same scene may fail.

In general, according to one embodiment, an information processing system includes a processor configured to detect a first object in an image in time-series image data and output object information indicating a detection of the first object. The processor is further configured to calculate a movement status of one or more pixels included in the image by using a plurality of images in the time-series image data, and then output movement information indicating the movement status of the one or more pixels. The processor is configured to detect whether the second object moves in conjunction with the first object based on the object information and the movement information.

In the following, certain example embodiments of an information processing system related to the present disclosure will be described with reference to the accompanying drawings.

First Embodiment

The information processing system related to the first embodiment uses a movement area that is located around an object (first object) (such as a person) that is detected from image data, and then determines the presence or absence of another object (hereinafter referred to as a moving object or second object) that moves in conjunction with the first object. As a result, it is possible, with higher accuracy, to detect a moving object even though the moving object may have a different appearance or the like image to image or while moving. Furthermore, by using the movement area, it is also possible to prevent erroneous association between objects.

Figure 1:
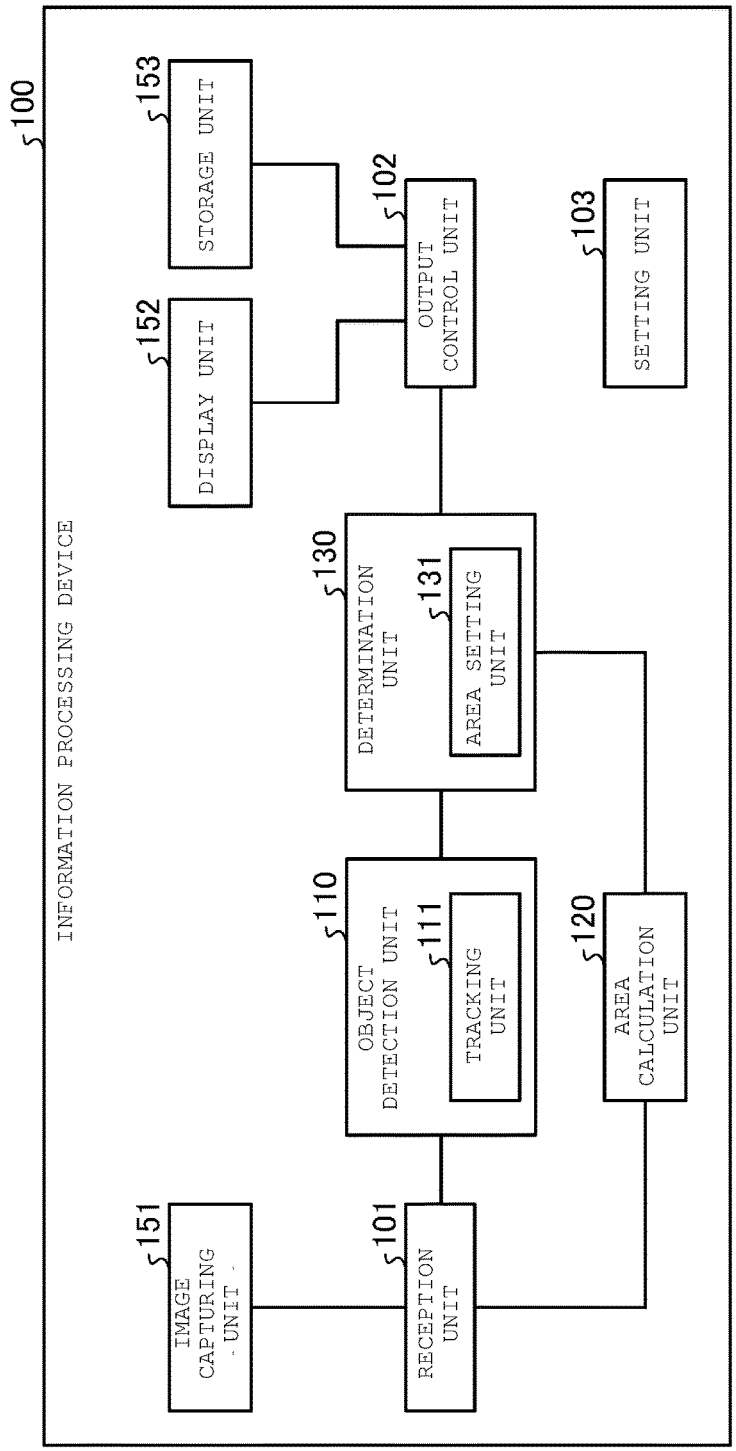
FIG. 1 is a block diagram of an information processing system related to a first embodiment.

FIG. 1 is a block diagram showing an example of the configuration of an information processing device 100 as the information processing system related to the first embodiment. As shown in FIG. 1, the information processing device 100 includes an image capturing unit 151, a display unit 152, a storage unit 153, a reception unit 101, an object detection unit 110, an area calculation unit 120, and a determination unit 130, an output control unit 102, and a setting unit 103.

The image capturing unit 151 can be an image capturing device such as a camera that captures or otherwise acquires image data. For example, the image capturing unit 151 records images of an imaging area set as a target region for detecting an object and a moving object, and sequentially outputs image data of the target region in time-series as captured at different imaging times. The time-series image data may be video image data or the like output at a constant frame rate. The information processing device 100 may include a plurality of image capturing units 151.

The display unit 152 is a display device such as a liquid crystal display that displays various information for use and/or operation of the information processing device 100.

The storage unit 153 is a storage device that stores various information used in, or output by, the information processing device 100. For example, the storage unit 153 stores the image data supplied by the image capturing unit 151 and the processing results. The storage unit 153 may be any commonly used storage medium such as a flash memory, a memory card, a random access memory (RAM), a hard disk drive (HDD), an optical disk, or the like.

The reception unit 101 receives input of time-series image data (a sequence of images, each image having different acquisition times) from the image capturing unit 151. The reception unit 101 outputs the image data to the object detection unit 110 and the area calculation unit 120.

By analyzing the image data, the object detection unit 110 detects a specific object (first object) depicted in the image data and outputs information corresponding to the detection result for the specific object. In general, the specific object may be detected in any way available. In the present example, the specific object is a person or a transport device or apparatus that can be used for transporting another object (second object).

For example, the object detection unit 110 detects a first object within the image data as a specific pixel group at certain coordinates, a rectangular region, or an area in the image. The object detection unit 110 evaluates the type of the detected first object and also the reliability of the detection result. The object detection method by the object detection unit 110 may be any method, and for example, one of the following methods may be applied:
   learning-based object detection using a neural network
   object detection using feature data such as histograms of oriented gradients (HOG) feature analysis As shown in FIG. 1, the object detection unit 110 may include a tracking unit 111. The tracking unit 111 performs tracking processing for associating specific objects detected in different images. For example, the tracking unit 111 tracks an object between frames (frame-to-frame) by collating and associating an object detected in image data (a frame) captured at one time (e.g., most recent or current frame) with an object detected in image data captured at some previous time (a previous frame). The object detection unit 110 outputs object information including a tracking result from the tracking processing.

The association of objects between frames may be performed by any method. For example, the object detection unit 110 may employ a method of associating objects between frames based on one or more of the proximity of positions, the overlap ratio of object areas, the similarity of movement directions, the relationship between movement directions and displacement, shape, color, texture, and operation. When the tracking processing is not performed, the object detection unit 110 does need to not include the tracking unit 111.

The area calculation unit 120 calculates a movement area indicating a movement status of one or more pixels included in the image data by analyzing a plurality of received images, and outputs the movement area information according to the calculation result. For example, the movement area information indicates the presence and absence of movement, the movement direction, and/or the magnitude of movement with respect to an area with each pixel or a set of a plurality of pixels in the image data. The area calculation unit 120 calculates the movement area by, for example, background subtraction and/or optical flow.

The determination unit 130 detects the presence or absence of a moving body that moves in conjunction with another object (e.g., the first object) by using the object information and the movement area information. The determination unit 130 includes an area setting unit 131.

The area setting unit 131 sets a determination area according to the object information. The determination area is area inside which the presence or absence of a moving object is detected. For example, the area setting unit 131 sets the determination area according to the one of the following setting methods:
   The larger the size of the object indicated by the object information, the larger the size of the determination area. • Based on the position of the object indicated by the object information, a determination area is set as some surrounding area around the position of the object.

The position of the determination area with respect to the object is set based on the position of the object indicated by the object information and the movement direction of the object indicated by the tracking result or the like.

The determination unit 130 detects the presence or absence of a moving object inside the determination area. For example, the determination unit 130 detects the presence or absence of a moving object by using the movement area located within the determination area from among all the detected movement areas indicated by the movement area information.

The determination unit 130 can detect the presence or absence of a moving object by using the movement area information to calculate a score indicating the certainty of movement in conjunction with another object (e.g., a first object). Next, the determination unit 130 detects whether a moving object (a second object) that is moving in conjunction with another object (a first object) is present or absent according to the comparison result between the score and the threshold value.

When a score is used such that the larger the score value is, the higher the certainty is, the determination unit 130 determines that there is an object moving in conjunction with another object when the score is larger than the threshold value. When a score is used in which the smaller the score value is, the higher the certainty is, the determination unit 130 determines that there is an object moving in conjunction with another object when the score is equal to or less than the threshold value.

In general, the score may be calculated in any way, and for example, one of the following index values may be used as the score:
   (S1) The square measure of the movement area indicated by the movement area information in the determination area;
   (S2) The difference between the movement direction indicated by the movement area information in the determination area, and the movement direction of a specific object indicated by the object information (tracking result);
   (S3) The difference between the movement amount indicated by the movement area information in the determination area, and the movement amount of a specific object indicated by the object information (tracking result); or
   (S4) The value obtained by combining a plurality of indexes (for example, the square measure of (S1) and the inverse of the difference of (S2), or the like)

The method for determining the presence or absence of a moving object is not limited to the method using the score as described above. For example, the determination unit 130 may perform a determination by using a learning device (learning model) that receives object information and movement area information from within the determination area and outputs information indicating the presence or absence of a moving object. The learning device is, for example, a neural network and/or an AdaBoost type meta-algorithm.

In some examples, the determination unit 130 may determine the presence or absence of a moving object without first setting the determination area. In this case, the determination unit 130 may not need to include the area setting unit 131. For example, when a learning device is used that has learned not to detect that an object far from the position of an object indicated by the object information is an object moving in conjunction with the specific object, it is possible to determine the presence or absence of the object moving in conjunction with the specific object even if the determination area is not set around the position of the other object.

The output control unit 102 controls the output of various information. For example, the output control unit 102 controls processing for outputting the determination result provided by the determination unit 130 to at least one of the display unit 152 and the storage unit 153.

The setting unit 103 sets parameters that determine the processing by each of the above units. For example, according to an instruction from the user, the setting unit 103 sets at least some of the parameters that determine aspects of the detection processing performed by the object detection unit 110, parameters that determine the calculation processing performed by the area calculation unit 120, and parameters that determine the determination processing performed by the determination unit 130. These parameters do not have to be set according to an instruction from a user, and may, in some examples, be set by using, for example, a machine learning model.

Settable parameters that may be set by setting unit 103 or otherwise are, for example, the following:
(P1) Parameters that determine detection processing
  A threshold value for detecting an object (threshold value for comparison with reliability, or the like)
  An object detection method to be applied
  Applicability of tracking processing
(P2) Parameters that determine calculation processing
  The method to be applied (e.g., whether to use background subtraction or optical flow)
(P3) Parameters that determine determination processing
  A setting method of the determination area
  A threshold value to be compared with the score
  The method to be applied (e.g., a method comparing a score to the threshold value or a method using a learning device)

Each of reception unit 101, the object detection unit 110, the area calculation unit 120, the determination unit 130, the output control unit 102, and the setting unit 103 can be implemented by one or a plurality of processors. For example, these various units may be implemented in software by causing a processor, such as a central processing unit (CPU), to execute a program. Each of these units may also or instead be implemented in hardware as a special-purpose processor such as a dedicated integrated circuit (IC). Likewise, these units may be implemented by using software and hardware in combination. When a plurality of processors are used, each processor may implement a single one of the units or may implement two or more of the units.

Figure 4:
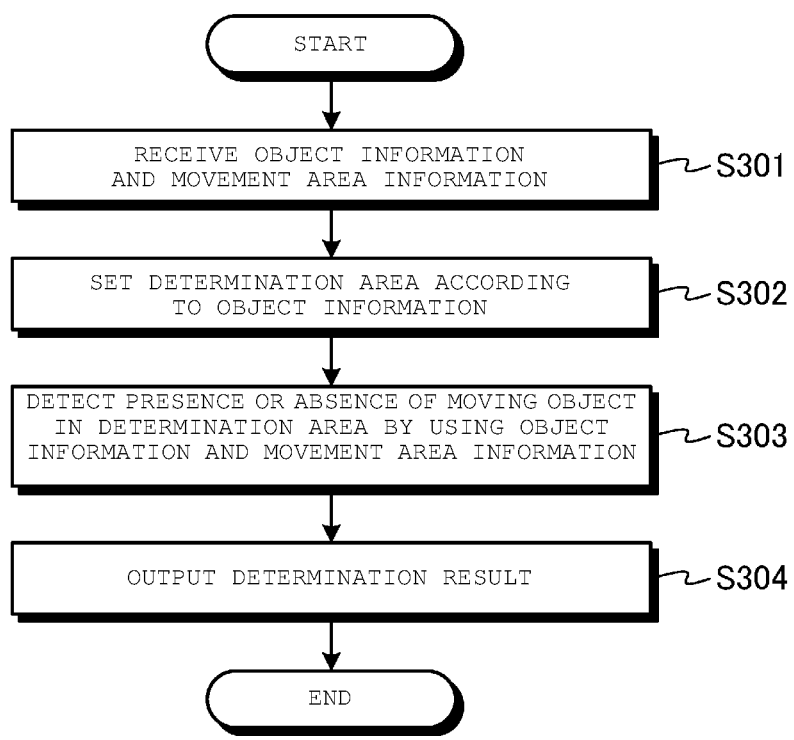
FIG. 4 is a flowchart of determination processing according to a first embodiment.

Next, the information processing by the information processing device 100 related to the first embodiment configured in this way will be described with reference to FIGS. 2 to 4. The information processing includes detection processing by the object detection unit 110 (FIG. 2), calculation processing by the area calculation unit 120 (FIG. 3), and determination processing by the determination unit 130 (FIG. 4).

The detection processing and the calculation processing may be executed in parallel, or one may be executed first and the other may be executed later. The determination processing is executed after the detection processing and the calculation processing have been executed.

FIG. 2 is a flowchart showing an example of the detection processing according to the first embodiment.

The object detection unit 110 receives image data from the reception unit 101 (step S101). By analyzing the image data, the object detection unit 110 detects a specific object (predetermined first object) in the image data and outputs object information indicating the detection result (step S102). When the tracking unit 111 is provided, the tracking unit 111 executes tracking processing for collating and associating an object detected in the current frame to the detection result of a past frame (step S103). The object detection unit 110 outputs object information including the tracking result (step S104), and ends the detection processing. The object information is sent to the determination unit 130.

FIG. 3 is a flowchart showing an example of the calculation processing according to the first embodiment.

The area calculation unit 120 receives a plurality of images (time-series image data) from the reception unit 101 (step S201). The area calculation unit 120 analyzes the image data and calculates a movement area indicating a movement area (portions/regions of the images in which movement is apparent) within the image data (step S202). The area calculation unit 120 outputs the movement area information, which is this calculation result (step S203), and ends the calculation processing. The movement area information is sent to the determination unit 130.

FIG. 4 is a flowchart showing an example of the determination processing according to the first embodiment.

The determination unit 130 receives the object information from the object detection unit 110 and the movement area information from the area calculation unit 120 (step S301). The area setting unit 131 sets a determination area based on the object information (step S302). The determination unit 130 detects the presence or absence of an object moving in conjunction with the detected object based on the object information in the determination area and the movement area information (step S303).

The determination unit 130 may modify the movement area information according to the relationship between the area of the object and the movement area, and then perform a determination by using the modified movement area information. For example, when a moving object cannot exist inside the area of the object, the determination unit 130 modifies the movement area so as to exclude the movement area overlapping the area of the object or modifies to reduce the movement amount corresponding to the movement area overlapping the area of the object. The amount to be reduced may be, for example, the movement amount of the object.

Figure 5:
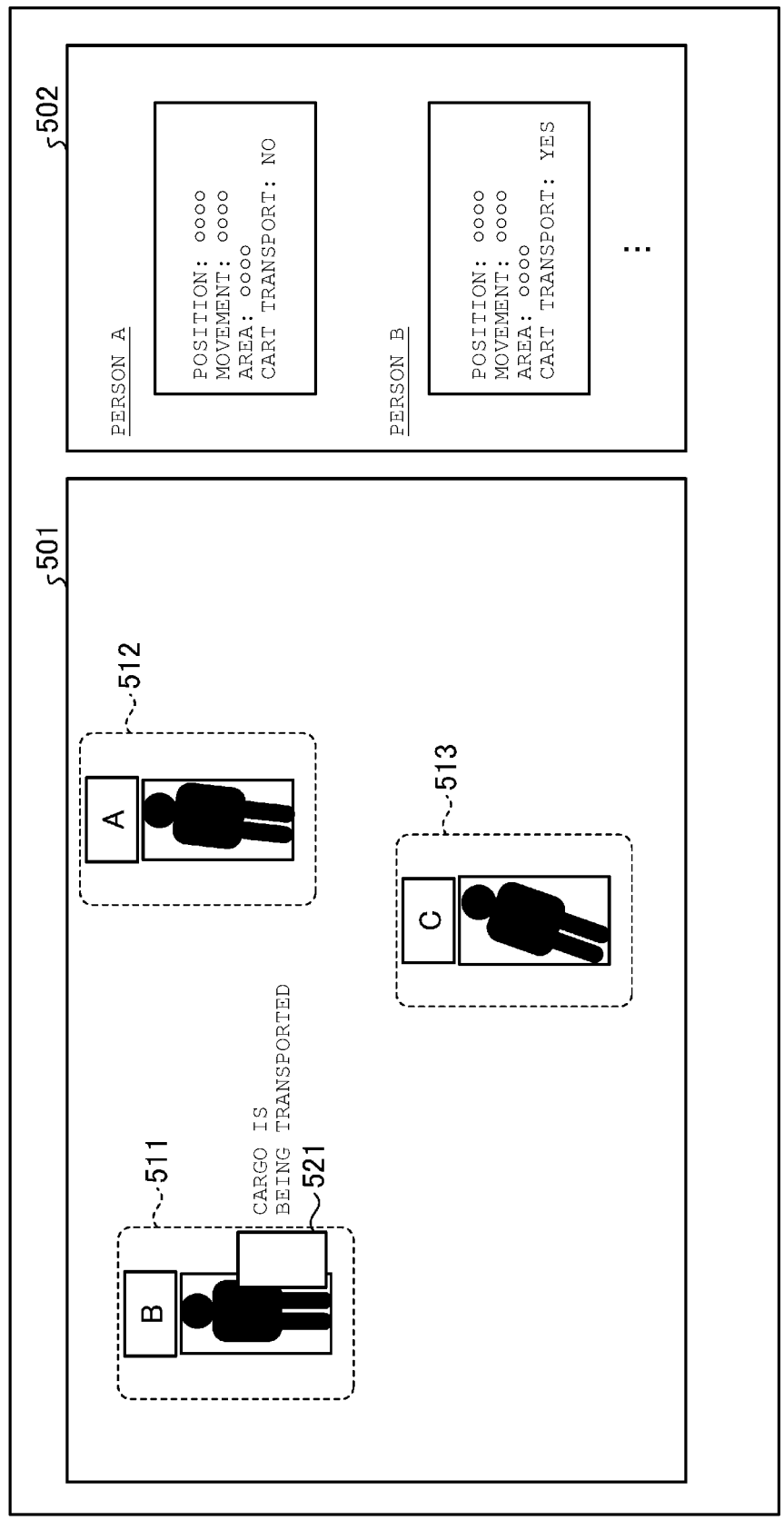
FIG. 5 is a diagram showing an example of a display screen including a determination result.

The output control unit 102 outputs the determination result by the determination unit 130 to at least one of the display unit 152 and the storage unit 153 (step S304). FIG. 5 is a diagram showing an example of a display screen including a determination result output to the display unit 152. The display screen of FIG. 5 is an example of a screen when a person is detected as the first object (specific object) and the presence or absence of a piece of cargo being transported by the person is detected as the second object.

As shown in FIG. 5, the display screen includes image data 501 (which reflects the input image data) and a determination result 502 based on evaluation/analysis of the image data 501. With respect to the vicinity of each person (person A, person B, person C) detected by the object detection unit 110, the image data 501 displays determination areas 511, 512, 513 set by the area setting unit 131, and an image 521 indicating a moving object (second object) that is determined to be present by the determination unit 130 in an overlapping manner with a detected person (person B). The determination result 502 includes the result of the determination processing for the detected persons A and B. The determination result 502 may include and display the object information or the movement area information, or both the object information and the movement area information, together with the result of the determination processing, on the display screen. The output control unit 102 may display the determination result 502 and the image data 501 in an overlapping manner.

In the determination result 502 of the display screen of FIG. 5, although the abbreviated result of the determination processing of the person A and the person B is displayed, the result of the determination processing of the person C may be displayed by a screen operation (e.g., scrolling) or the like, and not limited thereto, the results of the determination processing of three or more persons may be displayed all at once.

In some examples, only a person who is determined to be transporting cargo (like the person B in FIG. 5) and corresponding information might be displayed as the determination result 502 by the determination unit 130. Further, the determination result 502 may display the result of the determination processing of the entire image data 501 as summary such as, for example, "three persons are detected, of which one person is transporting cargo" on the display screen.

When the determination result can be output to the storage unit 153, the output control unit 102 stores, for example, the determination result from the determination unit 130 in the storage unit 153 for each detected object. The output control unit 102 may further store one or more of the detected time period, the input data in that time period, and the output result of each unit, in the storage unit 153.

Figure 6:
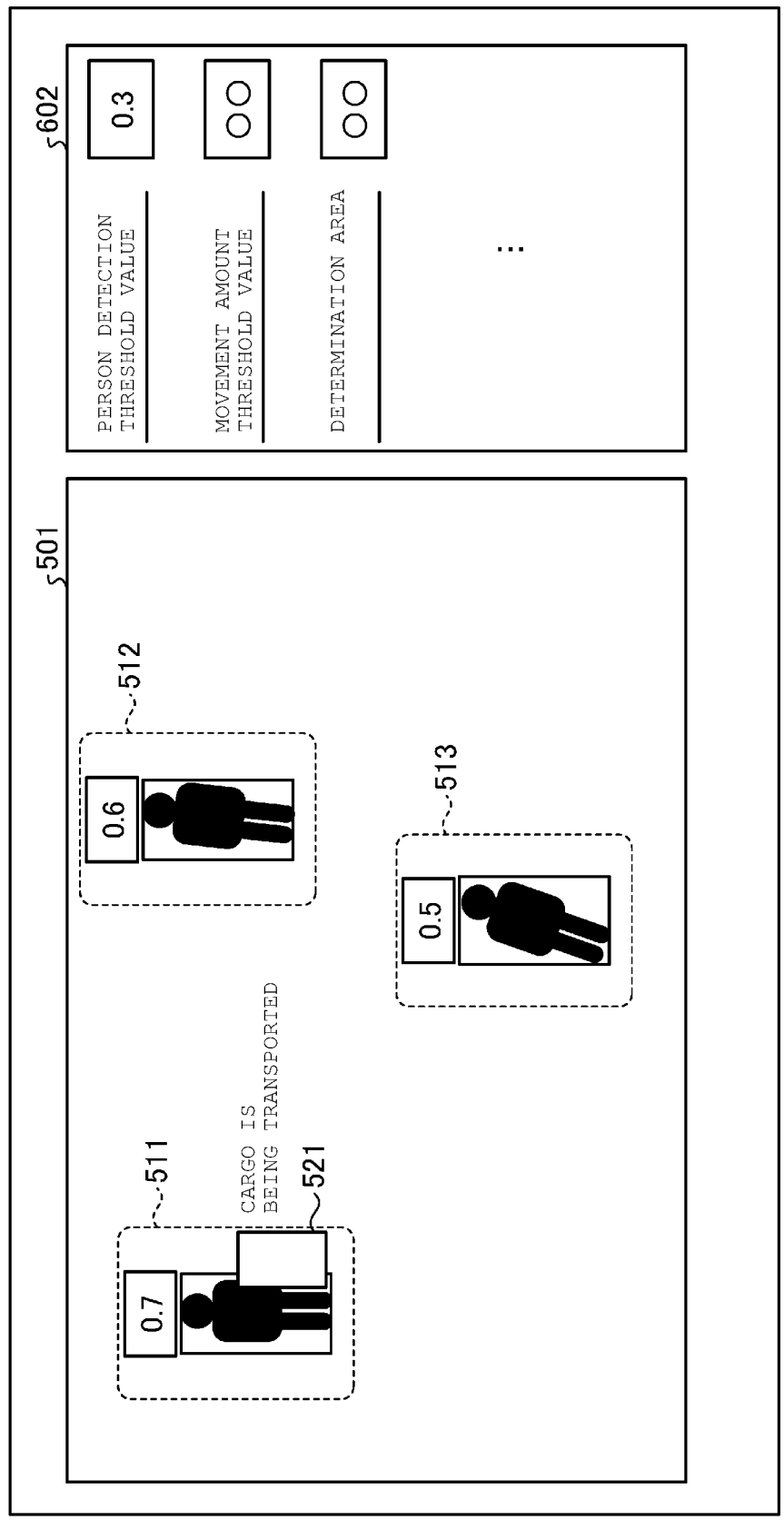
FIG. 6 is a diagram showing an example of a setting screen.

As described above, in the first embodiment, a setting unit 103 for setting various parameters for each unit as necessary is provided. FIG. 6 is a diagram showing an example of a setting screen used for setting parameters via the setting unit 103.

The setting screen of FIG. 6 includes the same image data 501 as that of FIG. 5 and a parameter setting field 602. FIG. 6 shows an example in which the reliability (0.7, 0.6, and 0.5) calculated at the time of detection is displayed in association with each person. In the parameter setting field 602, the parameters used in each processing may be set by the operation of the user or the like.

For example, after executing processing by using the parameters previously set, the user changes a portion or all of the parameters via the setting screen as shown in FIG. 6. The processing on the image data 501 is then re-executed using the changed (new) parameters. The output control unit 102 displays an updated setting screen to reflect the result of re-execution.

The parameters may be changed in real time in parallel with the processing for the image data to be sequentially captured. For example, when a parameter is changed, processing using the updated parameter is used with the image data received thereafter.

Next, a specific example of a system to which the first embodiment can be applied will be described. As described above, the information processing system of the first embodiment detects a specific object in the image data, calculates a movement area (moving portions within the image data), and detects the presence or absence of an object moving in conjunction with the specific object by using the movement area information.

Figure 7:
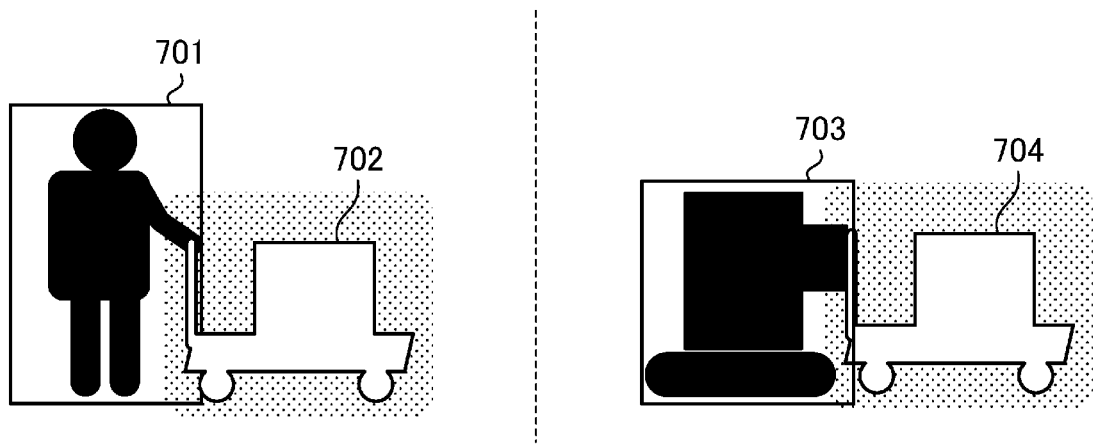
FIG. 7 is a diagram showing an application example of a system which determines a transport status of a cargo.

The information processing system of the first embodiment can be applied to a system for determining a transport status of cargo being moved by a person or a transport device within a warehouse or a cargo loading facility. FIG. 7 is a diagram showing such a system. The system of FIG. 7 detects a person 701 as a specific object (first object) and determines the presence or absence of a cargo 702 (piece of cargo; second object) as an object moving in conjunction with the person 701. The system of FIG. 7 can also detect a transport device 703 as a specific object (a first object instead of person 701) and determine the presence or absence of a cargo 704 (piece of cargo; second object) as an object moving in conjunction with the transport device 703.

Figure 8:
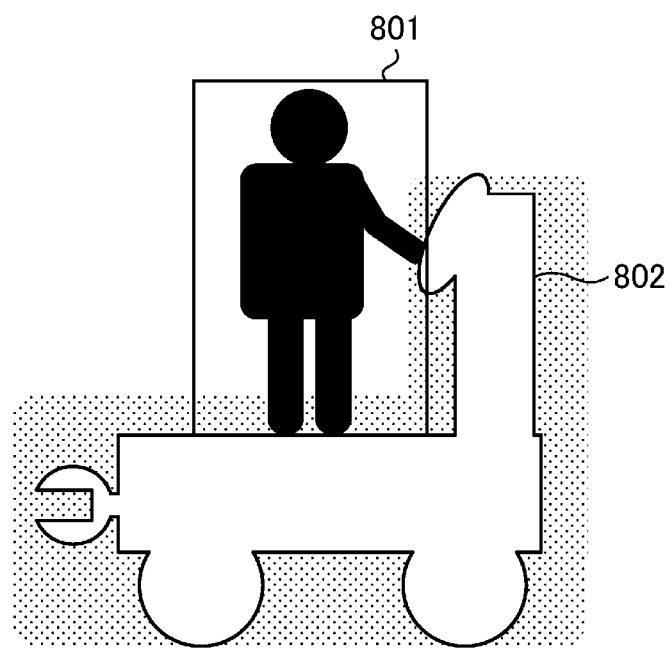
FIG. 8 is a diagram showing an application example of a system which determines a passenger boarding status of a vehicle.

The information processing system of the first embodiment can also be applied to a system for determining the boarding status of a person getting on a vehicle (or other moving body that is capable of moving with a person on board). FIG. 8 is a diagram showing an application example to such a system. The system of FIG. 8 detects a person 801 and then detects the presence or absence of a vehicle 802 as an object moving in conjunction with the person 801.

As described above, in the information processing system related to the first embodiment, it is possible to detect an object that moves in conjunction with a specific object, such as a person, with higher accuracy.

Second Embodiment

In the first embodiment, for example, it may be possible to detect that an object is a person but it may not be possible to individually (specifically) identify the person (to identify an individual). Similarly, in the first embodiment, for example, it may be possible to detect that the object is a transport device but it may not be possible to identify an individual type, model, or instance of a transport device. However, the information processing system of the second embodiment further individually identifies the detected first object, and then detects the presence or absence of an object moving in conjunction with the first object by using the specific identification result as well.

Figure 9:
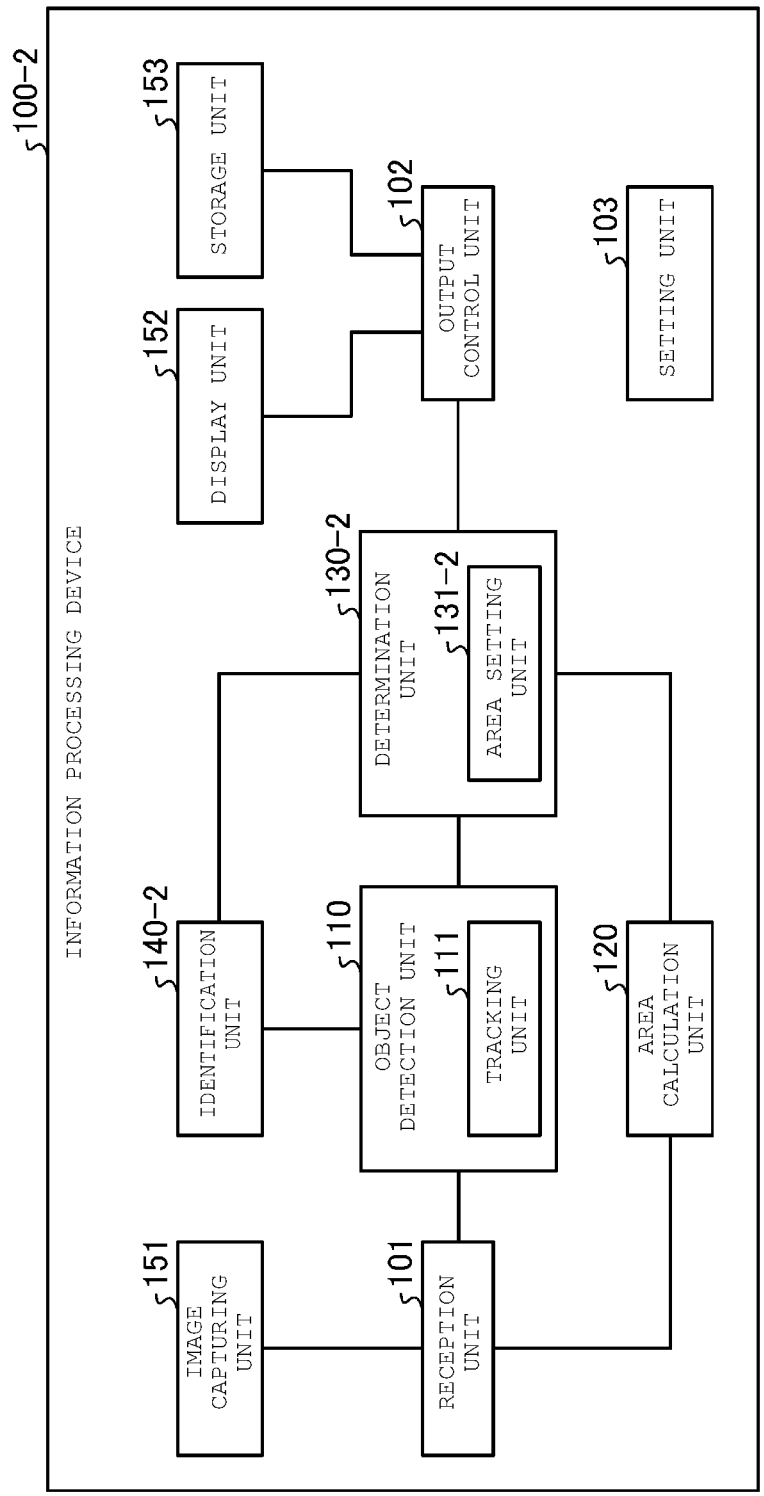
FIG. 9 is a block diagram of an information processing system related to a second embodiment.

FIG. 9 is a block diagram showing an example of the configuration of the information processing device 100-2 as an information processing system according to the second embodiment.

As shown in FIG. 9, the information processing device 100-2 includes an image capturing unit 151, a display unit 152, a storage unit 153, a reception unit 101, an object detection unit 110, an area calculation unit 120, and a determination unit 130-2, an identification unit 140-2, an output control unit 102, and a setting unit 103.

In the second embodiment, the identification unit 140-2 is added, and the function of the determination unit 130-2 (area setting unit 131-2) is different from that in the first embodiment. Other configurations and functions are the same as those described in conjunction with FIG. 1, which is a block diagram of the information processing device 100 related to the first embodiment, and thus the same reference numerals are given, and the description of corresponding aspects will be omitted here.

The identification unit 140-2 uniquely (specifically) identifies an individual detected by the object detection unit 110 as a first object, and outputs the identification result. For example, the identification unit 140-2 extracts individual information with respect to an object detected by the object detection unit 110 based on one or more of appearance information such as shape, color, texture, and operation.

The identification unit 140-2 uniquely identifies the object by collating the individual information with the previously known (acquired) individual information that is registered in advance or the previously known individual information obtained with respect to the object captured in a past frame.

For example, when the specific object is a person such as an employee or worker, individual information for each individual can be stored in advance in the storage unit 153 or the like, and the identification unit 140-2 identifies the detected object by collating the specific object with the stored individual information. The identification result by the identification unit 140-2 is output to the determination unit 130-2.

The determination unit 130-2 detects the presence or absence of an object that moves in conjunction with the detected individual by using the identification result from the identification unit 140-2 in addition to the object information and the movement area information. For example, the area setting unit 131-2 in the determination unit 130-2 changes the position that sets the determination area with respect to the object and the size of the determination area according to the identification result. The determination unit 130-2 may change the parameters of the determination processing according to the identification result.

For example, when the specific object is a person, such additional information such as movement speed (average walking speed, or the like) and the preferred cargo transport method (e.g., in which direction the cargo is placed with respect to the body, or the like) may differ for each individual. The area setting unit 131-2 sets, for example, a determination area that is larger with respect to an individual having a relatively fast movement speed than for an individual having a relatively slow movement speed.

Furthermore, when the specific object is a transport device, the movement speed and the cargo transport method (cargo loading position, or the like) may differ for each individual (model or type) of transport device. The area setting unit 131-2 sets, for example, a determination area larger with respect to a transport device having a relatively fast movement speed than for a transport device having a relatively slow movement speed.

Information such as the movement speed may be stored in the storage unit 153, for example. As described above, according to the second embodiment, since the determination processing by the determination unit 130-2 can be executed according to the individual identification result, more accurate determination is possible.

Figure 10:
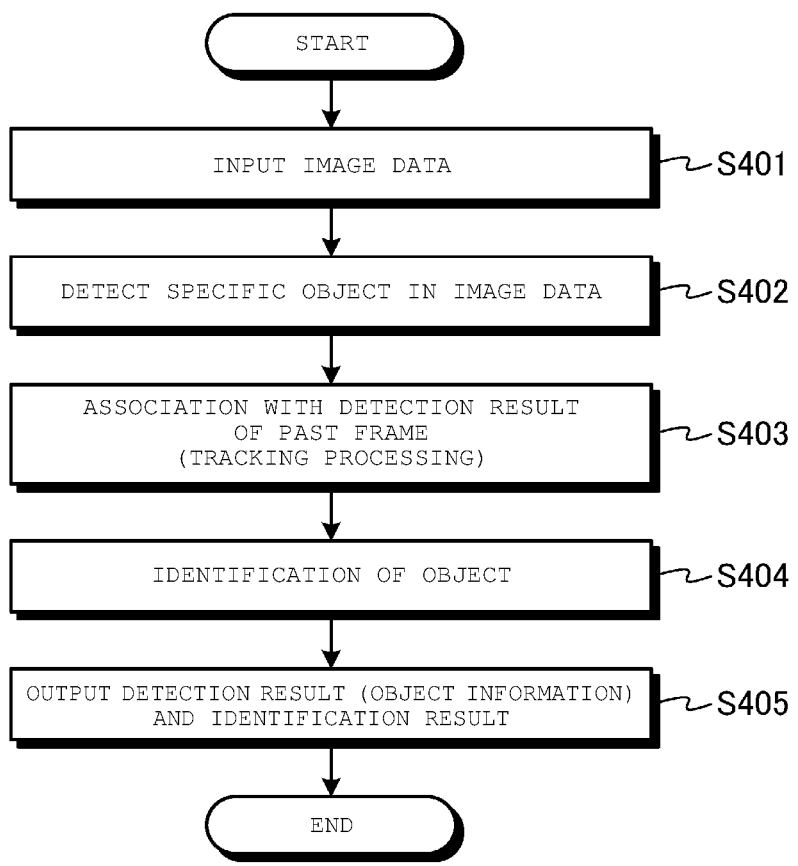
FIG. 10 is a flowchart of detection processing according to a second embodiment.

Next, the detection processing by the information processing device 100-2 related to the second embodiment will be described. FIG. 10 is a flowchart showing an example of the detection processing according to the second embodiment.

The step S401, step S402, and step S403 are substantially the same processing as described for step S101 to step S103 in the information processing device 100 related to the first embodiment, additional description of steps S401 to S403 will be omitted.

The identification unit 140-2 executes the identification processing on the object detected by the object detection unit 110 and outputs the identification result (step S404). The object detection unit 110 outputs the object information, and the identification unit 140-2 outputs the identification result (step S405).

Figure 11:
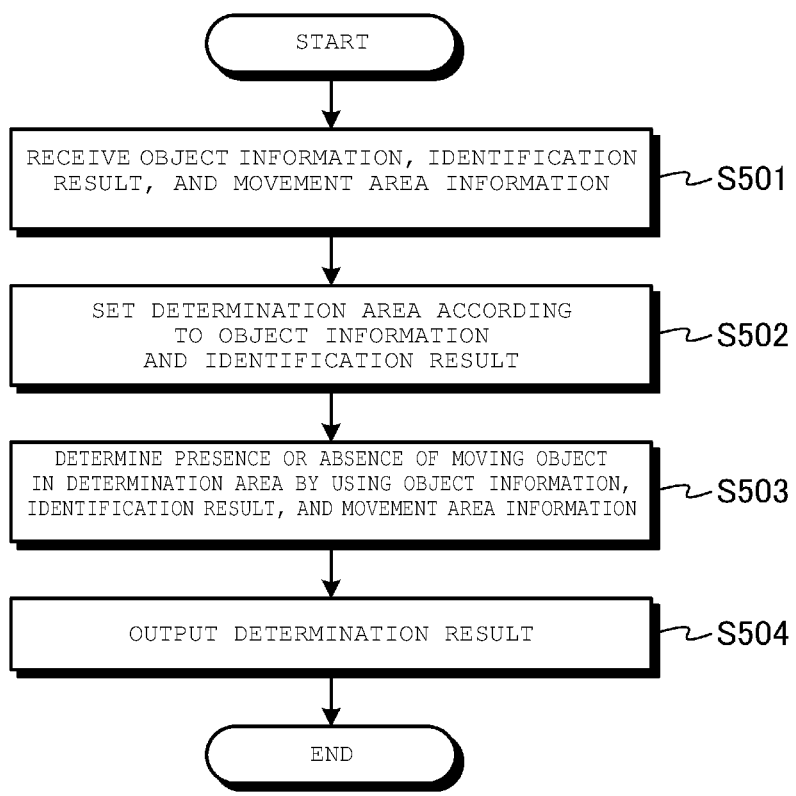
FIG. 11 is a flowchart of determination processing according to a second embodiment.

Next, the determination processing by the information processing device 100-2 related to the second embodiment will be described. FIG. 11 is a flowchart showing an example of the determination processing in the second embodiment.

The determination unit 130-2 receives the object information from the object detection unit 110, the identification result from the identification unit 140-2, and the movement area information from the area calculation unit 120 (step S501). The area setting unit 131-2 sets the determination area based on the object information and also the identification information (step S502). The determination unit 130-2 detects the presence or absence of an object moving in conjunction with the detected object based on the object information in the determination area, the identification result, and the movement area information (step S503). The output control unit 102 outputs the determination result from the determination unit 130-2 to at least one of the display unit 152 and the storage unit 153 (step S504).

As described above, in the second embodiment, particular individuals can be detected, and the determination processing can be executed according to the identification result. As a result, the determination of the moving object can be executed with higher accuracy.

Modification Example

The information processing devices of the first and second embodiments can be, for example, an example of an information processing system implemented by one logical or physical device. However, the described functions of the information processing system may be implemented by a plurality of different logical or physical devices.

Figure 12:
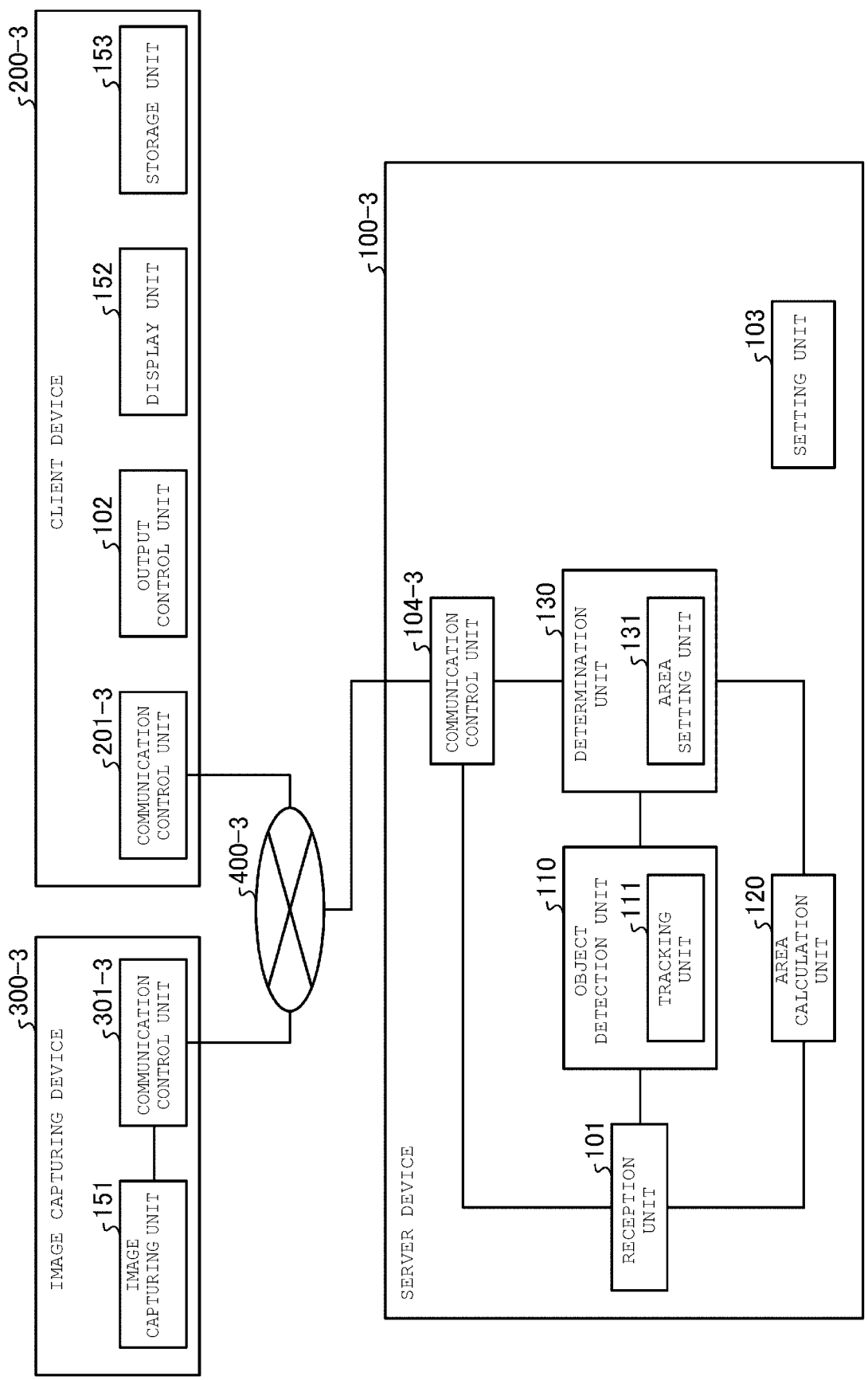
FIG. 12 is a block diagram of an information processing system related to a modification example.

FIG. 12 is a block diagram showing an example of the configuration of the information processing system related to this modification example that is implemented on a plurality of different devices. As shown in FIG. 12, the information processing system of the modification example has a configuration in which an image capturing device 300-3, a client device 200-3, and a server device 100-3 are connected by a network 400-3. The aspects that are the same as those described in conjunction with FIG. 1 are designated by the same reference numerals, and a detailed description thereof will be omitted.

The network 400-3 may be, for example, the Internet, but may be any other form of network. The network 400-3 may be any of a wired network, a wireless network, and a network in which a wired network and a wireless network are mixed.

The image capturing device 300-3 includes an image capturing unit 151 and a communication control unit 301-3.

The communication control unit 301-3 controls the communication of information to an external device such as the server device 100-3. For example, the communication control unit 301-3 transmits the image data captured by the image capturing unit 151 to the server device 100-3.

The client device 200-3 includes a communication control unit 201-3, an output control unit 102, a display unit 152, and a storage unit 153.

The communication control unit 201-3 controls the communication of information to an external device such as the server device 100-3. For example, the communication control unit 201-3 receives the determination result of the determination unit 130 from the server device 100-3. The output control unit 102 controls, for example, the processing of outputting the determination result received by the communication control unit 201-3 to at least one of the display unit 152 and the storage unit 153.

The server device 100-3 includes the reception unit 101, the object detection unit 110, the area calculation unit 120, the determination unit 130, a communication control unit 104-3, and the setting unit 103.

The communication control unit 104-3 controls the communication of information to external devices such as the image capturing device 300-3 and the client device 200-3. For example, the communication control unit 104-3 receives the image data from the image capturing device 300-3 and passes the image data to the reception unit 101. The communication control unit 104-3 transmits the determination result of the determination unit 130 to the client device 200-3.

The server device 100-3 may be implemented as, for example, a server device constructed on a cloud environment.

The distribution the functions shown in FIG. 12 is an example, and is not limited thereto. For example, the image capturing device 300-3 may incorporate all of the functions of the object detection unit 110, or a portion of the functions of the object detection unit 110 (for example, up to a function of extracting feature data, or the like). For example, although the setting unit 103 is provided in the server device 100-3 here, it may instead be provided in the client device 200-3. Further, although FIG. 12 shows an example that is implemented by distributing the functions of the information processing system to three devices, the information processing system may be distributed to two or four or more devices.

As described above, according to the first to second embodiments, it is possible to determine with higher accuracy the presence or absence of an object (moving object) that operates in conjunction with a specific object.

Figure 13:
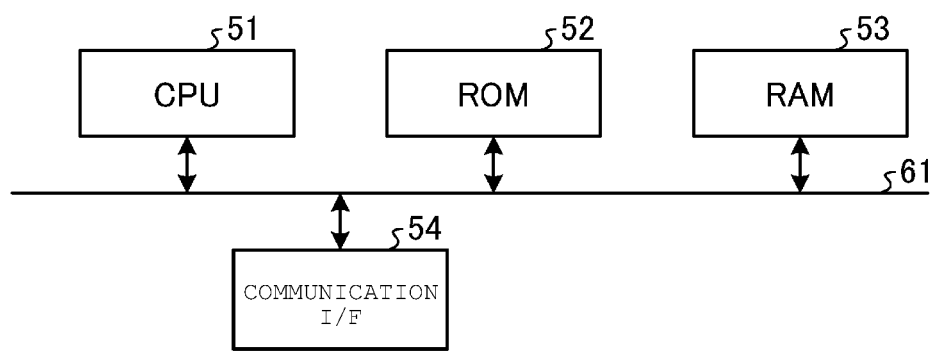
FIG. 13 is a hardware configuration diagram of a device related to at least one embodiment.

Next, the hardware configuration of certain devices (e.g., an information processing device, a client device, a server device) related to the first and/or second embodiment will be described with reference to FIG. 13. FIG. 13 is a schematic diagram showing a hardware configuration example of devices related to the first and second embodiment.

The devices related to the first or second embodiment includes a control device (controller) such as a CPU 51, a storage device (such as a read only memory (ROM) 52 or a RAM 53), a communication I/F 54 that connects to a network to perform communication, and a bus 61 that connects to each sub-unit.

The program(s) executed by the device(s) related to the first or second embodiment can be provided by being incorporated in the ROM 52 in advance.

The program(s) executed by the device(s) related to the first or second embodiment may be provided in an installable format or an executable format. Such file(s) can be recorded on a non-transitory computer-readable recording medium such as a compact disk read only memory (CD-ROM), a flexible disk (FD), a compact disk recordable (CD-R), and a digital versatile disk (DVD), or stored on a computer connected to a network such as the Internet, and downloaded via the network. The program(s) executed by the device(s) related to the first or second embodiment may be provided or distributed via a network such as the Internet.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An information processing system, comprising:
   a processor configured to:
      detect a specific object in an image in time-series image data and output object information indicating a detection of the specific object;
      calculate a movement status of one or more pixels included in the image including the specific object by using a plurality of images in the time-series image data, and then output movement information indicating the movement status of the one or more pixels; and
      detect whether an associated object is being moved by the specific object based on the object information and the movement information, wherein
   the processor is further configured to set a determination area that is proximate to the specific object according to the object information, the determination area being an image area in which the presence of the associated object can be detected based on the movement status of pixels within the determination area, and
   the processor detects the presence of the associated object based on a comparison of a threshold value to a score based on at least one of a difference between a movement direction of the specific object and a movement direction of the associated object and a difference between a movement amount of the specific object and a movement amount of the associated object.

2. The information processing system according to claim 1, further comprising:
   a camera configured to provide the time-series image data.

3. The information processing system according to claim 1, further comprising:
   a display device connected to the processor via a communication interface and configured to display a detection result indicating the presence of the associated object.

4. The information processing system according to claim 1, wherein
   the processor is further configured to:
      identify the specific object as a particular person and output an identification result indicating the identification of the particular person, and
   the detection of whether the associated object is being moved by the specific object is further based on the identification result.

5. The information processing system according to claim 1, wherein the movement status is calculated by using background subtraction.

6. The information processing system according to claim 1, wherein the specific object is a person.

7. The information processing system according to claim 1, wherein the processor is further configured to perform a tracking process to determine the position of the specific object in a plurality of images in the time-series image data.

8. The information processing system according to claim 1, wherein the processor is further configured to output a detection result to at least one of a display device or a storage device, the detection result indicating whether the associated object is being moved by the specific object.

9. The information processing system according to claim 1, further comprising:
   a camera configured to provide the time-series image data;

a display device connected to the processor via a communication interface and configured to display a detection result indicating the associated object is being moved by the specific object; and a storage device connected to the processor via the communication interface and configured to store the detection result.

10. The information processing system according to claim 1, wherein the specific object is a cargo transporting device, and
the associated object is a piece of cargo.

* * * * *